United States Patent [19]

Jarinko et al.

[11] Patent Number: 4,598,864
[45] Date of Patent: Jul. 8, 1986

[54] HIGH CROP OVERHEAD SPRAYER FRAME

[75] Inventors: Philip A. Jarinko, Lansdale; Frans Schuitemaker, Sellersville; Paul W. Bishop, Telford, all of Pa.

[73] Assignee: Union Carbide Corporation, Danbury, Conn.

[21] Appl. No.: 229,283

[22] Filed: Jan. 28, 1981

[51] Int. Cl.⁴ .............................................. B05B 9/08
[52] U.S. Cl. .................................................. 239/152
[58] Field of Search ............................ 239/152-154, 239/280-281, 525, 532

[56] References Cited

U.S. PATENT DOCUMENTS

| 1,183,391 | 5/1916 | Mason | 239/280 |
| 2,692,799 | 10/1954 | Parrott | 299/97 |
| 3,481,346 | 12/1969 | McBurnett | 134/181 |

FOREIGN PATENT DOCUMENTS

| 1164746 | 10/1958 | France | 239/154 |
| 652781 | 2/1963 | Italy | 239/281 |
| 226411 | 4/1943 | Switzerland | 239/153 |

Primary Examiner—Andres Kashnikow
Assistant Examiner—Michael J. Forman
Attorney, Agent, or Firm—Clement Vicari

[57] ABSTRACT

A sprayer frame is provided for use with a liquid spray system wherein an accurate and uniform application of liquid to a high crop situation is desired.

10 Claims, 1 Drawing Figure

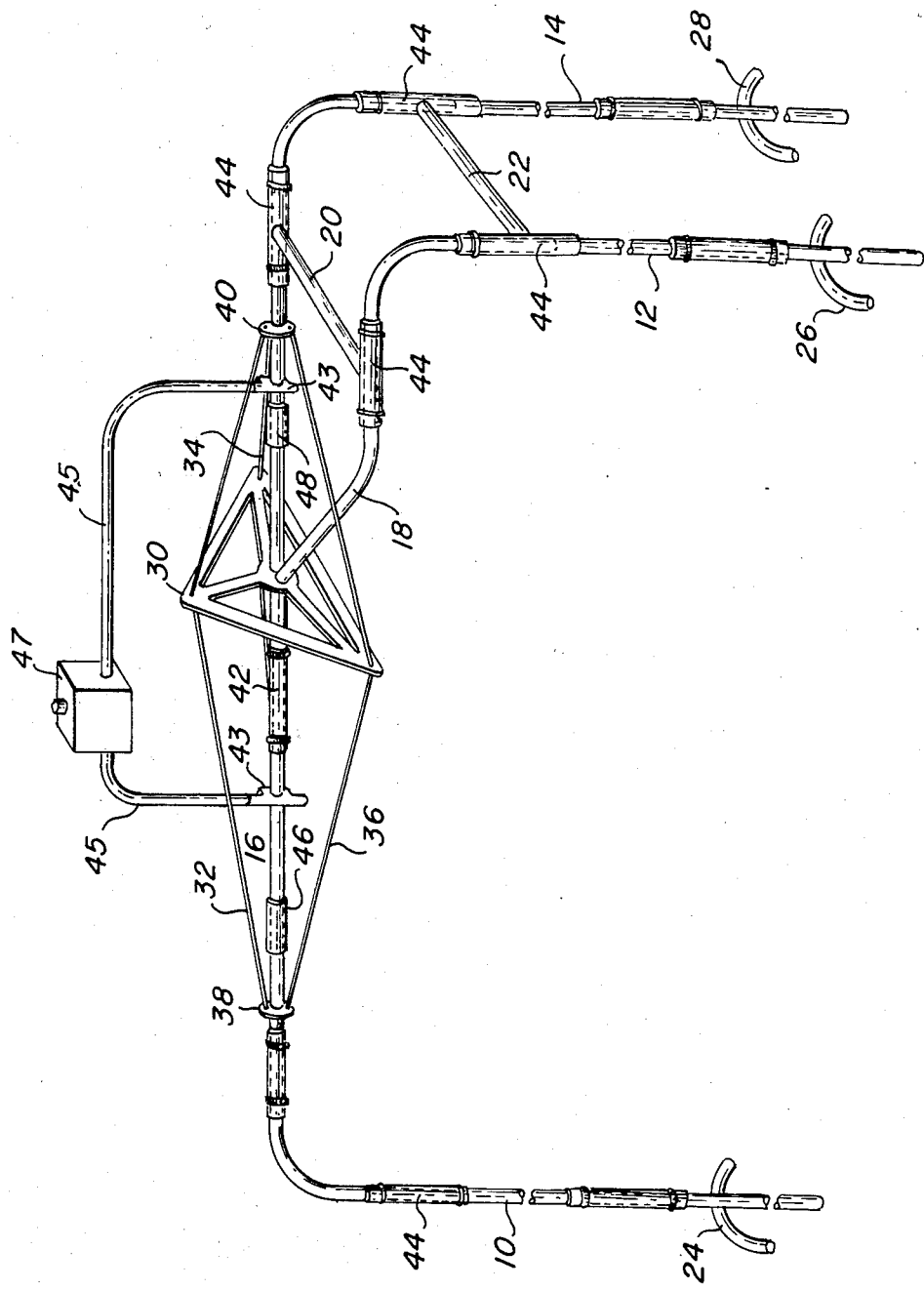

HIGH CROP OVERHEAD SPRAYER FRAME

This invention relates in general to a high crop overhead sprayer frame. In one aspect, this invention relates to a novel sprayer frame configuration for use with a liquid spray system. In a further aspect this invention is directed to a sprayer frame which allows one to accurately and uniformly apply liquid sprays to high crop situations.

Prior to the present invention it was the practice to use a boom mounted to a ground or air vehicle for the application of liquids, such as insecticides, herbicides, or fertilizers, to large plots of high crops such as corn, sorghum, sugar cane and tobacco. The known vehicle mounted booms are not only expensive and large, but are not accessible to certain types of terrain. For small to medium plot sizes, a manually carried T-bar or inverted "U" frame was often employed. Although the old manually carried frames have greater accessibility to a variety of terrain types, for the most part, they are not stable enough to provide the uniformity and accuracy of application required in certain small to medium size areas.

Accordingly, one or more of the following objects will be achieved by the practice of this invention. It is an object of this invention to provide a sprayer frame onto which is affixed a liquid spray delivery system for accurate and uniform application of liquids to a high crop situation. Another object of this invention is to provide a sprayer frame which is ideally suited for use in small plots or plots which are not easily accessible by vehicle mounted booms. A further object of this invention is to provide a sprayer frame which is easily and quickly assembled or dismantled into a compact unit for ease of transportation from one location to another. Another object is to provide a liquid spray system which requires as few as three persons to operate. These and other objects will readily become apparent to those skilled in the art in the light of the teachings hereinafter set forth and in the single drawing which is a view in perspective of the sprayer frame of the present invention.

Referring now more particularly to the drawing, the sprayer frame of the present invention as depicted is comprised of at least three vertically disposed leg members 10, 12 and 14, preferable tubular in shape, two of which are connected to each other by a linear horizontal boom member 16. A third leg member 12 is connected to a second horizontal member 18 which is attached to the first horizontal member at some point between the two vertical leg members 10 and 14. Vertical leg member 12 and horizontal boom member 18 are in parallel arrangement and equidistant from vertical member 14 and horizontal member 16 and are connected thereto by cross support members 20 and 22. The sprayer frame is also fitted with carrying supports 24, 26 and 28 which serve as shoulder rests for greater stabilization while moving the sprayer frame through the crops. The shoulder rests can also swivel about the vertical members to accomodate the position of the worker in a row. Triangular Stand off brace member 30 is affixed to horizontal boom member 16 and serves as a guide for wires 32, 34 and 36 which in turn are attached to the horizontal boom member 16 at points 38 and 40 for additional stability, particularly when the boom member is extended. Linear horizontal member 16 can contain several extension members of lesser diameters which telescope at a point such as 42 inside boom member 16 and which can be extended as verticle leg member 10 is moved away from leg members 12 and 14. Proper adjustment in the lengths of wires 32, 24 and 36 can then be made to stabilize the frame. The entire frame can also be disassembled at various points, such as 44 for storage or ease of transportation, particularly through uneven terrain situations.

In its best mode, the overhead sprayer frame of this invention is essentially of the form depicted in the drawing and is comprised of a lightweight but strong metal alloy. In practice, it was found that aluminum alloys such as number 6061-T6 provided by the P. A. Frasse Co. of Philadelphia, Pennsylvania, were ideally suited for use. Likewise it was found that one-sixteenth inch braided, stainless steel aircraft cable was suitable for use with the standoff brace to achieve a stable configuration, particularly in those instances when the boom is extended to its maximum.

The frame is also fabricated in such a manner that the horizontal boom and each of the legs can be extended by tubular members which are of lesser diameters and can telescope into the respective boom or leg members. Moreover, the frame can be dismantled easily by disconnect joints located at various positions.

It is readily apparent from the foregoing description that the frame is adjustable to accommodate a variety of terrains and crop situations. Since each of the legs can be fitted with telescopic extensions, the horizontal portion of the frame can be raised to a point suitable for spraying even the tallest crops. For example, the frame can be extended to reach as high as 15-16 feet, even though 12 feet is sufficient for most purposes. For uneven terrain situations, or for differences in height of the workers using the spray system, each leg can be adjusted independently to provide the desired horizontal position.

The horizontal portion of the frame can likewise be elongated or shortened by means of a telescopic feature to accommodate variations in row widths. For example, with the use of the standoff brace and stabilizing cables the frame can be extended to widths as great as 18 feet. However, for most practical purposes, widths of 15 feet or less are the most practical.

After the frame is assembled, nozzles can be attached to the horizontal portion of the frame at intervals for example with vari-spacing clamps and a flexible conduit leading from the nozzles to a liquid spray source. The liquid spray source can be contained, for example, in a back pack carried by one of the workers.

In contrast to the T-bar or inverted "U"-shaped frames which normally would be carried by one or two workers respectively, the use of the three-legged frame of this invention provides a stability to the system which insures an even, uniform spray of liquid onto the crop situation. A single worker holding a "T" shaped frame will find it difficult to hold the frame perpendicular at every moment of use, particularly, while traversing uneven terrain. Even slight stumbling, will tend to tilt the frame forward, while recovery will tend to pull it backward to the perpendicular position. Since the spray is usually continuous, this can easily result in some portions of the crop receiving a heavier spray than others, which is particularly undesirable where an accurate investigation of plant growth or protection response to new agricultural chemicals in controlled amounts is desired. Thus, the frame of this invention which has two side legs and a front leg provides a stable, limited flex manually carried structure for use in accurately and uniformly applying liquid sprays to high crop or non-crop situations.

By using the sprayer frame of this invention one is able to accurately and uniformly apply a liquid spray over a given area to a high crop situation. Prior methods necessitated the use of a large, expensive, sometimes power driven wheeled ground or air vehicle to perform the same task.

A further advantage of the overhead sprayer frame of this invention, is that spray stream of liquid can be directed to the rear and in the opposite direction in which the frame is being carried. The worker, for example, who carries the source of liquid to be sprayed can be stationed at the forward leg while the worker holding the leg directly behind him can control the spraying mechanism. Since the spray is directed rearward, in most instances, the workers will not need protective clothing such as is normally required for a T-bar or inverted "U"-shape spraying systems.

As indicated, the sprayer frame is easily disassembled and stored as a relatively small compact unit for transport from one location to another. This is particularly advantageous when high crops are growing in terrains which are normally inaccessible to vehicle mounted booms. Assembly of the frame is accomplished in a minimum of time and spraying can be effected with a minimum of three persons.

The frame of this invention is, as indicated, useful in spraying high crops with a variety of agricultural products. For example, it can be employed where an even, uniform application is desired of plant growth regulators, insecticides, or late applications of foliar fertilizers. The sprayer frame of the present invention is also particularly useful for the application of sprays to plots where many replications and varied treatments are needed to accurately investigate plant growth or protection response to spray applications. It allows one to make inexpensive, uniform spray applications to high crop situations as opposed to the use of presently available machinery and equipment which would cost many times more.

Although the invention has been illustrated by the preceding description, it is not to be construed as being limited to the materials employed therein, but rather, the invention relates to the generic area as hereinbefore disclosed. Various modifications amd embodiments thereof can be made without departing from the spirit and scope thereof.

What is claimed is:

1. A high crop overhead sprayer frame comprised of, in combination, at least three vertically disposed leg members, at least one linear horizontal boom member connecting the tops of first and second vertically disposed leg members; a second horizontal member having a portion thereof parallel to, and in the same plane as said linear horizontal boom member and having one end connected to said horizontal boom member at a point disposed between said first and second vertically disposed leg members and the other end connected to a third vertically disposed leg member, said third vertically disposed leg member connected to said first vertically disposed leg member by horizontal supporting members disposed at right angles to said horizontal boom member, and each of said vertically disposed leg members having support means for lifting and carrying said frame and means for attaching a plurality of spraying nozzles to said frame.

2. The sprayer frame of claim 1 wherein said linear horizontal boom member has means for extending the length of said member.

3. The sprayer frame of claim 2 wherein said means for extending the length is comprised of members which telescope into said boom member.

4. The sprayer frame of claim 1 wherein each of said vertically disposed leg members has means for extending the height of said leg members.

5. The sprayer frame of claim 4 wherein said means for extending the height of said leg members is comprised of members which telescope into said leg members.

6. The sprayer frame of claim 1 wherein said boom member has affixed thereto, a stand off brace and a plurality of connecting means from said stand off brace to each end of said boom member to stabilize said frame.

7. The sprayer frame of claim 6 wherein said stand off brace is triangular in shape and located on said boom member at a point near where said second horizontal member is connected to said boom member.

8. The sprayer frame of claim 7 wherein said connecting means are wire cables.

9. The sprayer frame of claim 1 wherein said members have having at least one point at which said frame can be dismantled.

10. The sprayer frame of claim 1 wherein said members are comprised of an aluminum alloy.

* * * * *